(12) United States Patent
Rockwood et al.

(10) Patent No.: US 7,603,720 B2
(45) Date of Patent: Oct. 13, 2009

(54) NON-REPUDIATION WATERMARKING PROTECTION BASED ON PUBLIC AND PRIVATE KEYS

(75) Inventors: Troy Rockwood, Thousand Oaks, CA (US); Wensheng Zhou, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 658 days.

(21) Appl. No.: 10/419,489

(22) Filed: Apr. 21, 2003

(65) Prior Publication Data

US 2003/0204729 A1    Oct. 30, 2003

Related U.S. Application Data

(60) Provisional application No. 60/376,212, filed on Apr. 29, 2002.

(51) Int. Cl.
*G06F 7/04*    (2006.01)
(52) U.S. Cl. .............................. 726/30; 726/26; 713/176
(58) Field of Classification Search ....................... None
See application file for complete search history.

(56) References Cited

U.S. PATENT DOCUMENTS

| | | | |
|---|---|---|---|
| 6,430,688 B1 * | 8/2002 | Kohl et al. | 713/156 |
| 6,769,061 B1 * | 7/2004 | Ahern | 713/176 |
| 6,804,779 B1 * | 10/2004 | Carroni et al. | 713/176 |
| 6,891,958 B2 * | 5/2005 | Kirovski et al. | 382/100 |
| 6,993,137 B2 * | 1/2006 | Fransdonk | 380/279 |
| 2001/0051996 A1 * | 12/2001 | Cooper et al. | 709/217 |
| 2002/0016916 A1 * | 2/2002 | Natarajan | 713/179 |

FOREIGN PATENT DOCUMENTS

| | | |
|---|---|---|
| EP | 0 746 126 A2 | 12/1996 |
| EP | 0 798 892 A2 | 10/1997 |

(Continued)

OTHER PUBLICATIONS

Jian Zhao A WWW Service to Embed and Prove Digital Copyright Watermarks May 1996 Proc. of the European Conference on Multimedia Applications, Services and techniques, Louvain-La_Neuve, Belgium pp. 1-15.*

(Continued)

*Primary Examiner*—Emmanuel L Moise
*Assistant Examiner*—David J Pearson
(74) *Attorney, Agent, or Firm*—Gates & Cooper LLP

(57) ABSTRACT

A system for creating non-repudiation (undeniable) watermarks, wherein a content provider uses outside distribution entities to distribute media content supplied by the content provider. Content watermarked by a distribution entity using this system is undeniably recognizable by the content provider as originating with that particular distribution entity. In other words, given N distribution entities, the content provider is able to tell which particular distribution entity watermarked the media content. The system does not allow any distribution entity to watermark media content so that would appear to have been watermarked by another distribution entity and the system does also not allow the content provider to watermark media content so that would appear to have been watermarked by a particular distribution entity. Consequently, this allows the content provider to place a high degree of trust in the identification of the distribution entity by means of the watermark.

40 Claims, 5 Drawing Sheets

FOREIGN PATENT DOCUMENTS

EP            0 982 927 A1      3/2000

OTHER PUBLICATIONS

Menezes et al. Handbook of Applied Cryptography 1997 CRC Press pp. 173-175.*

D. Augot et al., "Secure Delivery of Images over Open Networks", Special issue on identification and protection of multimedia information, Proceedings of the IEEE, Jul. 1999, 87(7):1251-1266.

Cox, Ingemar J., et al., "Secure Spread Spectrum Watermarking for Multimedia", *IEEE Transactions On Image Processing,* vol. 6, No. 12, Dec. 1997, pp. 1673-1687.

Koch, Eckhard, et al., "Copyright Protection for Multimedia Data", Fraunhofer Institute for Computer Graphics, Darmstadt, Germany, Dec. 16, 1994, pp. 1-15.

Haitsma, J., et al., "A Watermarking Scheme For Digital Cinema", Proceedings of the International Conference On Image Processing, 'Online! Oct. 7-10, 2001, pp. 487-489, XP002249974 Thessaloniki.

Swanson, Mitchell D., et al., "Multiresolution Scene-Based Video Watermarking Using Perceptual Models", *IEEE Journal On Selected Areas In Communications,* vol. 16, No. 4, May 1998, pp. 540-550.

Zhou, Wensheng, et al., "On-line Scene Change Detection of Multicast Video", *IEEE Journal of Visual Communication and Image Representation,* vol. 12, Mar. 2001, pp. 1-16.

Shapiro, Jerome M., "Embedded Image Coding Using Zerotrees of Wavelet Coefficients", *IEEE Transactions on Signal Processing,* vol. 41, No. 12, Dec. 1993, pp. 3445-3462.

Stromberg, Michael, "Secure Content Protection: An Overview of the Proposed Security Mechanisms In Digital Cinema", KTH Advanced Media Technology Lab, 'Online! Sep. 20, 2001, XP002249975 Stockholm, retrieved from the Internet: URL:www. amt.kth.es on Aug. 1, 2003, 17 pages.

Said, Amir, et al., "A New, Fast, and Efficient Image Codec Based On Set Partitioning In Hierarchical Trees", *IEEE Transactions On Circuits and Systems For Video Technology,* vol. 6, No. 3,Jun. 1996, pp. 243-250.

Wolfgang, Raymond B., et al., "Perceptual Watermarks for Digital Images and Video", *Proceedings of the IEEE,* vol. 87, No. 7, Jul. 1999, pp. 1108-1126.

Lin, C. Y., et al., "Rotation, Scale, and Translation Resilient Watermarking for Images", IEEE, Trans. On Image Processing, vol. 10, pp. 767-782, May 2001.

Pereira, S., et al., "Fast Robust Template Matching for Affine Resistant Image Watermarks", Proc. $3^{rd}$ Int. Information Hiding Workshop, pp. 207-218, 1999.

Solachidis, V., et al., "Circularly Symmetric Watermark Embedding in 2-D DFT Domain", IEEE Trans. On Image Processing, vol. 10, pp. 1741-1753, Nov. 2001.

Kirovski et al., "Digital Rights Management for Digital Cinema," Inter. Symp. on Optical Science & Tech.—Security in Imaging: Theory & Applications, San Diego, CA, Jul. 2001, 16 pages.

National Association of Theatre Owners; "Digital Cinema User Requirements," Feb. 22, 2002, pp. 1-3.

Hose et al., "Data Transport and Processing in a Digital Cinema Theatre System," Qualcomm Incorporated from the $36^{th}$ Advanced Motion Imaging Conference, Feb. 7-9, 2002, 21 pages.

* cited by examiner

NON-REPUDIATION WATERMARKING PROTECTION BASED ON PUBLIC AND PRIVATE KEYS

CROSS-REFERENCE TO RELATED APPLICATIONS

This application claims the benefit under 35 U.S.C. §119 (e) of commonly-assigned U.S. Provisional Patent Application Ser. No. 60/376,212, filed Apr. 29, 2002, by Troy Rockwood and Wengsheng Zhou, and entitled "NON-REPUDIATION WATERMARKING PROTECTION APPARATUS AND METHOD BASED ON PUBLIC AND PRIVATE KEY," which application is incorporated by reference herein.

This application is related to the following co-pending and commonly-assigned patent applications:

U.S. Utility patent application Ser. No. 10/419,490, filed on Apr. 21, 2003, by Ismael Rodriguez, entitled WATERMARKS FOR SECURE DISTRIBUTION OF DIGITAL DATA, which application claims the benefit under 35 U.S.C. §119(e) of commonly-assigned U.S. Provisional Patent Application Ser. No. 60/376,106, filed Apr. 29, 2002, by Ismael Rodriguez, entitled WATERMARK SCHEME FOR SECURE DISTRIBUTION OP DIGITAL IMAGES AND VIDEO, U.S. Utility patent application Ser. No. 10/419,491, filed on Apr. 21, 2003, by Ismael Rodriguez, entitled VISIBLE WATERMARK TO PROTECT MEDIA CONTENT FROM A SERVER TO PROJECTOR, which application claims the benefit under 35 U.S.C. §119(e) of commonly-assigned U.S. Provisional Patent Application Ser. No. 60/376,303, filed Apr. 29, 2002, by Ismael Rodriguez, entitled VISIBLE WATERMARK TO PROTECT MEDIA CONTENT FROM A SERVER TO PROJECTOR, and U.S. Utility patent application Ser. No. 10/419,495, filed on Apr. 21, 2003, by Wensheng Zhou and Phoom Sagetong, entitled DYNAMIC WAVELET FEATURE-BASED WATERMARK, which application claims the benefit under 35 U.S.C. §119(e) of commonly-assigned U.S. Provisional Patent Application Ser. No. 60/376,092, filed Apr. 29, 2002, by Wensheng Zhou and Phoom Sagetong, entitled DYNAMIC WAVELET FEATURE-BASED WATERMARK APPARATUS AND METHOD FOR DIGITAL MOVIES IN DIGITAL CINEMA, all of which applications are incorporated by reference herein.

BACKGROUND OF THE INVENTION

1. Field of the Invention

The invention relates to the field of digital watermarks, and more particularly, to non-repudiation watermarking protection based on public and private keys.

2. Description of the Related Art

With the recent growth of networked multimedia systems, techniques are needed to prevent (or at least deter) the illegal copying, forgery and distribution of media content, such as digital audio, images and video. Many approaches are available for protecting digital data; these include encryption, authentication and time stamping. It is also desirable to determine where and by how much the digital data has been changed from the original.

One way to improve a claim of ownership over digital data, for instance, is to embed a low-level signal or structure directly into the digital data. For example, a digital watermark uniquely identifies the owner and can be easily extracted from the digital data. If the digital data is copied and distributed, the watermark is distributed along with the data. This is in contrast to the (easily removed) ownership information fields allowed by the MPEG-2 syntax.

Most digital watermark schemes depend on a trusted third party to verify the authenticity of the watermark. The services of the trusted third party may be employed for storing digital watermark keys in escrow, wherein the keys are presented upon demand if there is a dispute. See, for example, D. Augot, J-M. Boucueau, J. F. Delaigle, C. Fontaine, and E. Goray, "Secure Delivery of Images over Open Networks," Proceedings of the IEEE, Vol. 87, No. 7, July 1999, which publication is incorporated by reference herein.

However, situations may arise, particularly where the value of the media content is very high, where a trusted third party cannot be found, at least not one that can be trusted by both parties. There is a need in the art, then, for systems that do not require a trusted third party for watermark key escrow. Specifically, there is a need in the art for digital watermarks that are non-repudiation watermarks and where the source of the embedded watermark can be accurately traced.

SUMMARY OF THE INVENTION

The present invention describes a system for creating non-repudiation (undeniable) watermarks, wherein a content provider uses outside distribution entities to distribute media content supplied by the content provider. Media content watermarked by a distribution entity using this system is undeniably recognizable by the content provider as originating with that particular distribution entity. In other words, given N distribution entities, the content provider is able to tell which particular distribution entity watermarked the media content. The system does not allow any distribution entity to watermark media content so that would appear to have been watermarked by another distribution entity and the system does also not allow the content provider to watermark media content so that would appear to have been watermarked by a particular distribution entity. Consequently, this allows the content provider to place a high degree of trust in the identification of the distribution entity by means of the watermark.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced.

It is to be understood that other embodiments may be utilized and structural changes may be made without departing from the scope of the present invention.

Overview

In a non-repudiation watermark scheme according to the preferred embodiment of the present invention, a content provider provides media content to a distribution entity. The content provider also generates a nonce, which is a pseudo-random value, and provides the nonce to the distribution entity. The distribution entity generates a public and private key pair (known as the watermark pair), and the private key of the watermark pair is used by the distribution entity to encrypt the nonce, wherein the encrypted nonce is known as a watermark key. The media content is then watermarked using the watermark key. The public key of the watermark pair is provided by the distribution entity to the content provider, along with additional information that identifies a location of the watermark in the watermarked media content. The additional information is used by the content provider to extract the watermark key from the watermarked media content, and the public key of the watermark pair is used by the content provider to decrypt the nonce from the extracted watermark key. In this manner, the content provider can determine which distribution entity watermarked the media content, if any.

Although there are many uses for this technology, it is especially applicable to forensic analysis relating to the distribution of media content in a media content distribution system. In such a system, media content must be kept secret and not be distributed except when accounted for by the system. Should the media content "leak" and become uncontrolled, it is desirable to locate the source of the leak, so that corrective action (legal and/or technical) can be taken.

Hardware Environment

Figure 1A:
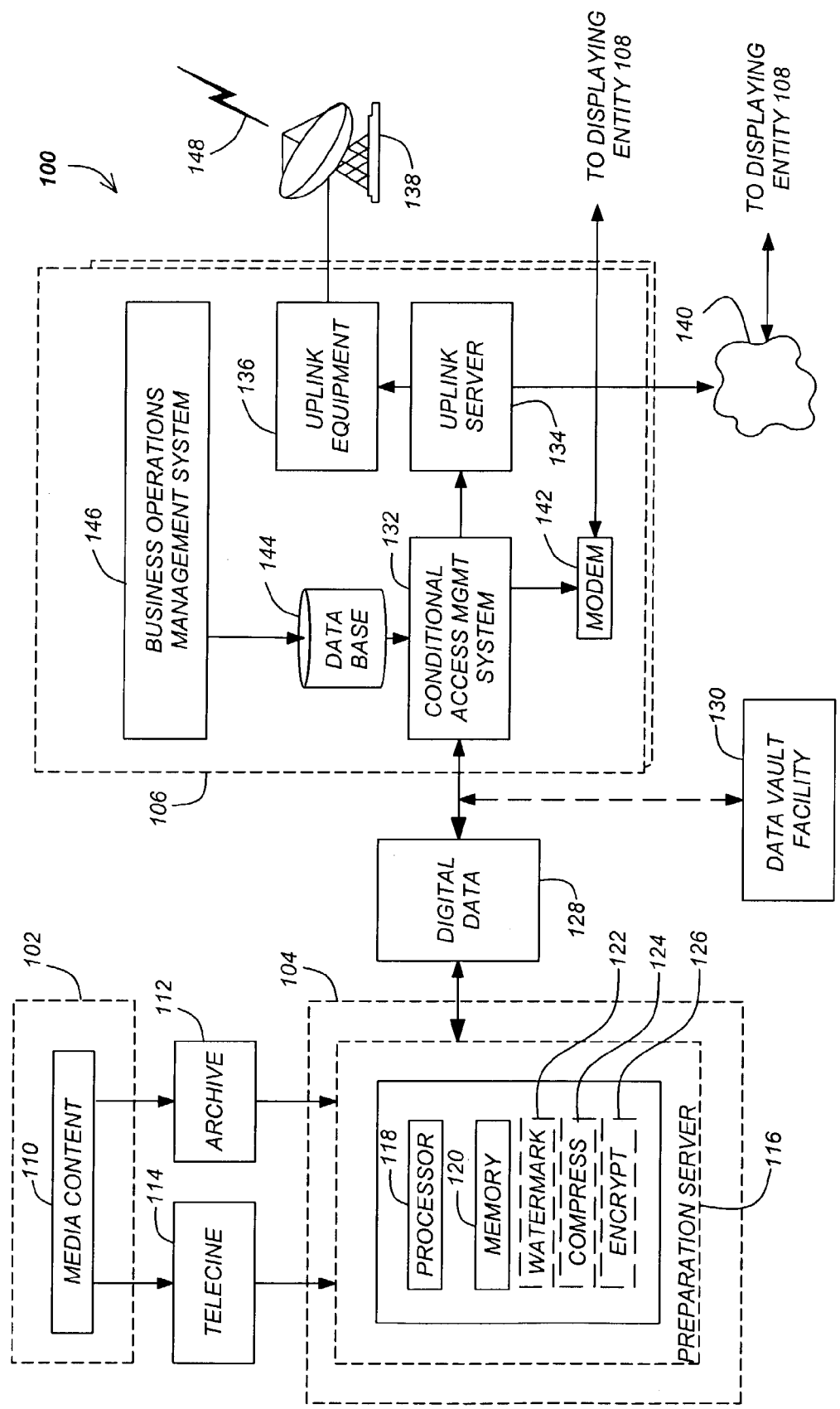
FIGS. 1A and 1B depict a top-level functional block diagram of one embodiment of a media content distribution system according to the preferred embodiment of the present invention.
Figure 1B:
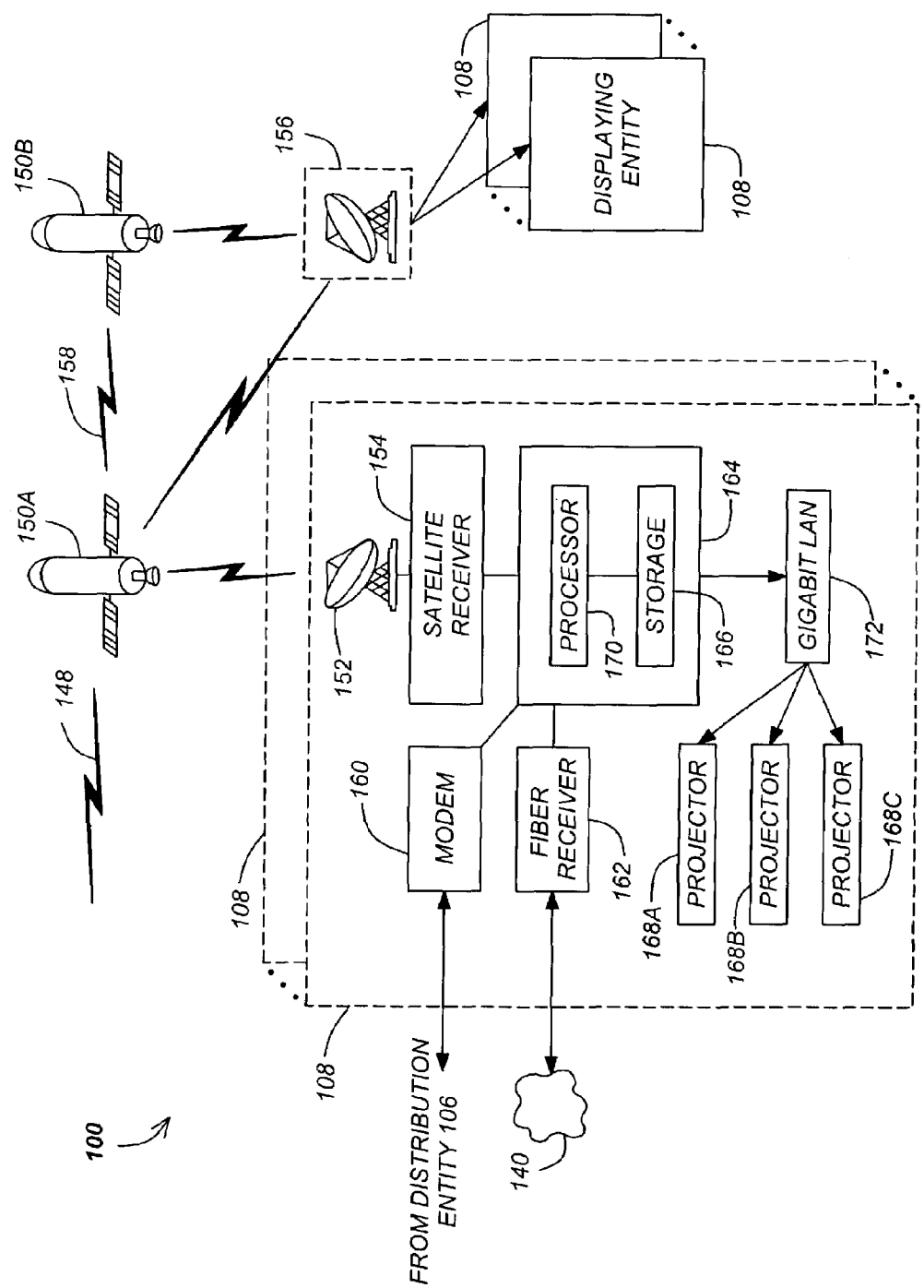

FIGS. 1A and 1B depict a top-level functional block diagram of one embodiment of a media content distribution system 100. The media content distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 from a secure archive facility 112.

The media content 110 may be telecined by processor 114 to format the media content as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can perform a watermarking process 122, apply a compression process 124, and/or perform an encrypting process 126 on the media content 110 to protect it, resulting in output digital data 128. Thus, the output digital data 128 may contain one or more data streams that has been watermarked, compressed and/or encrypted.

Once prepared, the output digital data 128 can be transferred to the distribution entity 106 via digital transmission, tape or disk (e.g., CD-ROM, DVD, etc.). Moreover, the output digital data 128 can also be archived in a data vault facility 130 until it is needed.

Although illustrated as separate entities, the protection entity 104 can be considered as part of the distribution entity 106 in the preferred embodiment and is communicatively positioned between the content provider 102 and the distribution entity 106. This configuration ameliorates some of the security concerns regarding the transmission of the output digital data 128 between the protection entity 104 and the distribution entity 106. In alternative embodiments, however, the protection entity 104 could be part of the content provider 102 or displaying entity 108. Moreover, in alternative embodiments, the protection entity 104 could be positioned between the distribution entity 106 and the displaying entity 108. Indeed, it should be understood that the protection entity 104, and the functions that it performs, may be employed whenever and wherever the media content moves from one domain of control to another (for example, from the copyright holder to the content provider 102, from the content provider 102 to the distribution entity 106, or from the distribution entity 106 to the display entity 108).

The distribution entity 106 includes a conditional access management system (CAMS) 132, that accepts the output digital data 128, and determines whether access permissions are appropriate for the output digital data 128. Further, CAMS 132 may be responsible for additional encrypting so that unauthorized access during transmission is prevented.

Once the output digital data 128 is in the appropriate format and access permissions have been validated, CAMS 132 provides the output digital data 128 to an uplink server 134, ultimately for transmission by uplink equipment 136 to one or more displaying entities 108, as shown in FIG. 1B. This is accomplished by the uplink equipment 136 and uplink antenna 138.

In addition or in the alternative to transmission via satellite, the output digital data 128 can be provided to the displaying entity 108 via a forward channel fiber network 140. Additionally, the output digital data may be transmitted to displaying entity 108 via a modem 142 using, for example a public switched telephone network line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. keys, billing, authorization, usage tracking, etc.), while the satellite network provides for transfer of the output digital data 128 to the displaying entities 108.

The output digital data 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Referring to FIG. 1B, the data transmitted via uplink 148 is received in a satellite 150A, and transmitted to a downlink antenna 152, which is communicatively coupled to a satellite or downlink receiver 154.

In one embodiment, the satellite 150A also transmits the data to an alternate distribution entity 156 and/or to another satellite 150B via crosslink 158. Typically, satellite 150B services a different terrestrial region than satellite 150A, and transmits data to displaying entities 108 in other geographical locations.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output digital data 128 and other information may be accepted into a processing system 164 (also referred to as a content server). The output digital data 128 may then be stored in the storage device 166 for later transmission to displaying systems (e.g., digital projectors) 168A-168C. Before storage, the output digital data 128 can be decrypted to remove transmission encryption (e.g. any encryption applied by the CAMS 132), leaving the encryption applied by the preparation processor 116.

When the media content 110 is to be displayed, final decryption techniques are used on the output digital data 128 to substantially reproduce the original media content 110 in a viewable form which is provided to one or more of the displaying systems 168A-168C. For example, encryption 126 and compression 124 applied by the preparation processor 118 is finally removed, however, any latent modification, undetectable to viewers (e.g., the results from the watermarking process 122) is left intact. In one or more embodiments, a display processor 170 prevents storage of the decrypted media content 110 in any media, whether in the storage device 166 or otherwise. In addition, the media content 110 can be communicated to the displaying systems 168A-168C over an independently encrypted connection, such as on a gigabit LAN 172.

Generally, each of the components of the system 100 comprise hardware and/or software that is embodied in or retrievable from a computer-readable device, medium, signal or carrier, e.g., a memory, a data storage device, a remote device coupled to another device, etc. Moreover, this hardware and/or software perform the steps necessary to implement and/or use the present invention. Thus, the present invention may be implemented as a method, apparatus, or article of manufacture.

Of course, those skilled in the art will recognize that many modifications may be made to the configuration described without departing from the scope of the present invention. Specifically, those skilled in the art will recognize that any combination of the above components, or any number of different components, may be used to implement the present invention, so long as similar functions are performed thereby.

Non-Repudiation of Watermarked Media Content

In using the watermarking process 122 described above, the present invention introduces a sequence of steps or functions that provides for non-repudiation of watermarked media content 110. This is useful when the source of the media content 110 needs to be known or proved. One such example is when media content 110 and presentations of that media content 110 must be accounted for, such as with copyrighted media content 110 and where the loss of control of that media content 110 could lead to monetary loss on the part of the content provider 102 (who is assumed to also be the copyright owner).

The present invention does not implement any protections to ensure that the watermark is applied properly; instead, it is assumed that both parties (the content provider 102 and the distribution entity 106) have willingly agreed to follow the procedure as outlined (or are constrained to do so by contractual or technical restraints). In the case where the distribution entity 106 or the content provider 102 wishes to "cheat" the other by circumventing the watermarking process 122, other measures must be taken to ensure that this is not done. Also, watermark attacks must also be addressed by the watermarking process 122 directly.

In the present invention, the watermarking process 122 requires the use of public and private key encryption between the content provider 102 and the distribution entity 106, wherein the keys are not shared with any other entity. This encryption is central to the identification of media content 110 watermarked by the distribution entities 106, as described in more detail below.

Figure 2:
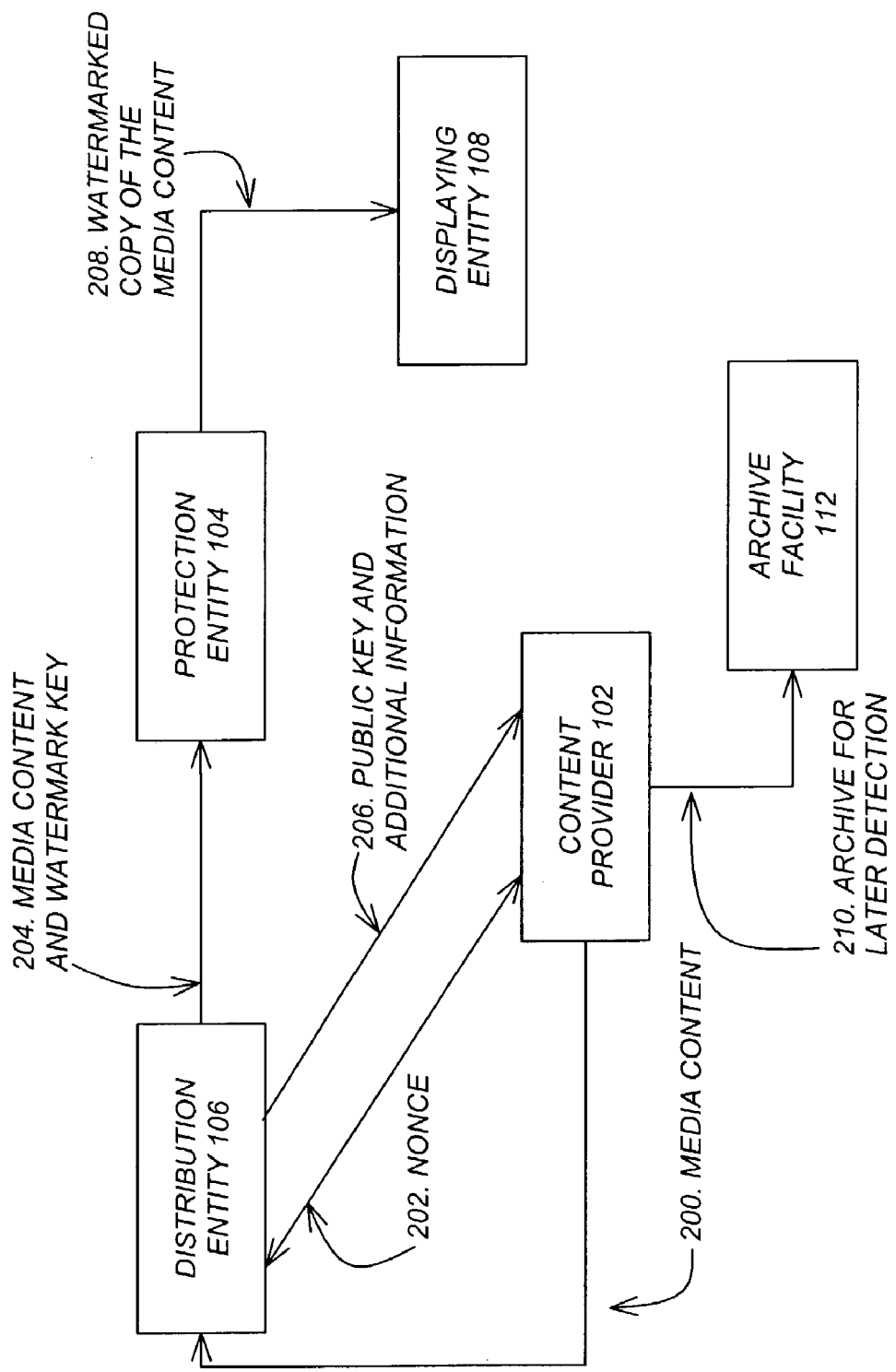
FIG. 2 is a dataflow diagram that illustrates the data flow of the non-repudiation watermark scheme according to the preferred embodiment of the present invention.

FIG. 2 is a dataflow diagram that illustrates the non-repudiation watermark scheme according to the preferred embodiment of the present invention.

Path 200 represents the content provider 102 sending the media content 110 to the distribution entity 106, wherein the distribution entity includes the protection entity 104. This may be done in a variety of ways including, but not limited to, transmission of the media content 110 through a data network, or distribution of the media content 110 on physical media (for instance, CD-ROMs or DVDs).

Once the media content 110 has been sent to the distribution entity 106, path 202 represents the distribution entity 106 contacting the content provider 102. This contact should be authenticated using "strong" authentication techniques.

After authenticating with one another, path 202 represents the content provider 102 providing a nonce to the distribution entity 106. A nonce is a pseudo-random value, wherein the content provider 102 generates the nonce, sends it to the distribution entity 106, the distribution entity 106 signs (encrypts) the nonce, and the distribution entity 106 then returns the encryption key to the content provider 102. This exchange should be protected by "strong" encryption techniques.

In the preferred embodiment, the size of the nonce is dictated by the watermarking algorithm being used. Many different types of watermarking algorithms may be used without departing from the scope of the present invention. Consequently, many different types of enonces may be used.

In the present invention, the distribution entity 106 generates a public and private key pair (known as the watermark pair) for encryption purposes. Specifically, the distribution entity 106 uses the private key of the watermark pair to encrypt the nonce received from the content provider 102, wherein the encrypted nonce is known as a watermark key.

Path 204 represents the distribution entity 106 providing the media content 110 and the watermark key to the protection entity 104. The watermarking process 122 of the protection entity 104 casts or embeds the watermark in the media content 110 using the watermark key, which results in the digital data 128 containing a watermarked copy of the media content 110.

After the watermark is cast (or before, depending on the type of watermark algorithm being used), path 206 represents the distribution entity 106 transmitting the public key of the watermark pair to the content provider 102, wherein the public key of the watermark pair is signed (encrypted) by the private key of the distribution entity 106 (not the private key of the watermark pair).

The distribution entity 106 also transmits additional information to the content provider 102, wherein the additional information allows the content provider 102 to extract the watermark key from the digital data 128 containing the watermarked copy of the media content 110. This additional information is also known as "location information," and identifies where the watermark key is embedded in the watermarked copy of the media content 110, i.e., which sub-bands, features, etc., of the media content 110.

Path 208 represents the protection entity 104 transmitting the digital data 128 containing the watermarked copy of the media content 110 to the displaying entity 108.

Finally, path 210 represents the content provider 102 storing the public key of the watermark pair and the additional information in an archive, such as the archive facility 112, so that the watermark key can be extracted from the digital data 128 containing the watermarked copy of the media content 110 at a later time.

Watermark Keys

The watermarking process 122 may use any number of different watermarking algorithms. The only qualification is that the watermarking algorithms should exhibit the following characteristics.

First, the watermarking algorithm should use a watermark key that can be used as a primary index key (i.e., there is a large number space from where the key is chosen such that no two keys are likely to be identical if keys are chosen randomly or pseudo-randomly). The watermark key should be detectable given information other than the value of the watermark key itself. Depending on the details of the situation where this technology is used, other properties (such as invariance under transforms) may be desired.

Second, the watermarking algorithm must create a unique watermark for each distinct watermark key. In this sense, the watermark key must come from a large key space.

For example, if the watermark key was only 8 bits in length, then it could only identify 256 distinct watermarks. In the system 100 described above, a large key size, e.g., 64 bits or more, comprises a better candidate to prevent accidental matching or key space exhaustion, in order to identify the media content 110 at each specific distribution entity 106 or displaying entity 108.

Third, the watermarking algorithm must allow blank or semi-blank detection. In other words, a watermark detection process should be able to detect the watermark without information or with very limited information.

Last and most importantly, the watermarking algorithm must be non-fragile and robust. Detection of the watermark key requires an retrieval of the embedded watermark from the digital data 128 containing the watermarked copy of the media content 110.

However, the robustness requirement is in conflict with the blank-detection requirement. Previous studies show that a blank-detected watermark is generally not as robust as a non-blank detected watermark. Consequently, the watermark algorithm must strike a reasonable balance between robustness and blank detection.

Watermarks that satisfy these requirements are described in co-pending and commonly-assigned U.S. Utility patent application Ser. No. 10/419,495, filed on Apr. 21, 2003, by Wensheng Zhou and Phoom Sagetong, entitled DYNAMIC WAVELET FEATURE-BASED WATERMARK, which application claims the benefit under 35 U.S.C. §119(e) of commonly-assigned U.S. Provisional Patent Application Ser. No. 60/376,092, filed Apr. 29, 2002, by Wensheng Zhou and Phoom Sagetong, entitled DYNAMIC WAVELET FEATURE-BASED WATERMARK APPARATUS AND METHOD FOR DIGITAL MOVIES IN DIGITAL CINEMA, both of which applications are incorporated by reference herein.

Watermark Casting Process

Figure 3:
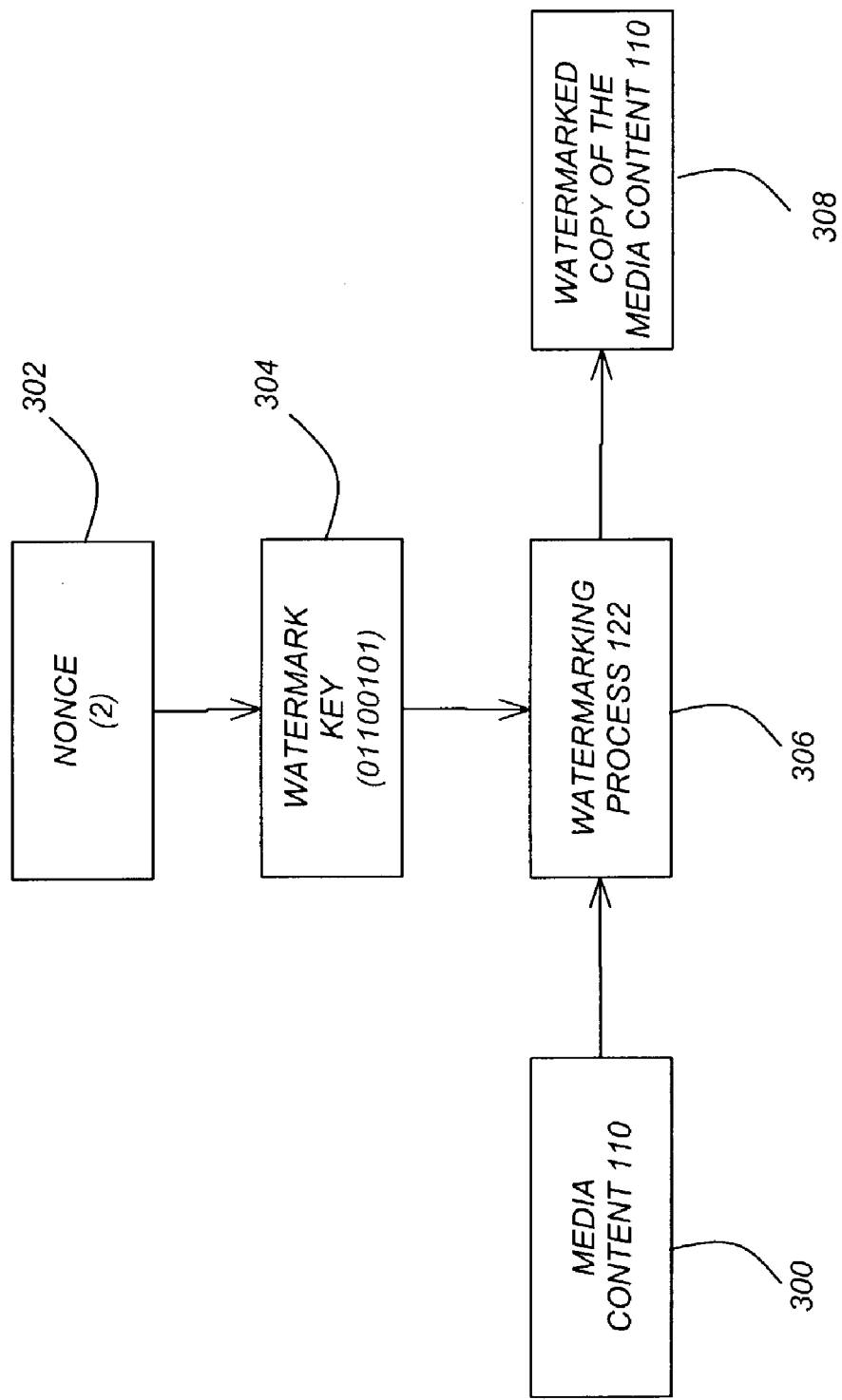
FIG. 3 is a flowchart that further illustrates the steps performed in the watermark casting process according to the preferred embodiment of the present invention.

FIG. 3 is a flowchart that further illustrates the steps performed in the watermark casting process according to the preferred embodiment of the present invention.

Block 300 represents the content provider 102 distributing the media content 110 to one or more distribution entities 106.

Block 302 represents the content provider 102 providing a unique nonce (the value 2 in this example) to each distribution entity 106. A unique nonce may be transmitted to each distribution entity at any granularity, i.e., once per media content 110, once per content provider 102, once per distribution entity 106, once per displaying entity 108, once per presentation, etc.

Block 304 represents the nonce being encrypted by the distribution entity 106 using the private key of the watermark pair, wherein the encrypted nonce is the watermark key. In this example, the watermark key is a binary string "01100101."

Block 306 represents the watermarking process 122 casting the watermark in the media content 110 using the watermark key, which results in the digital data 128 containing the watermarked media content 110.

Finally, Block 308 represents the watermarked media content 110 being output from the watermarking process 112 as the output digital data 128.

Watermark Detection Process

Figure 4:
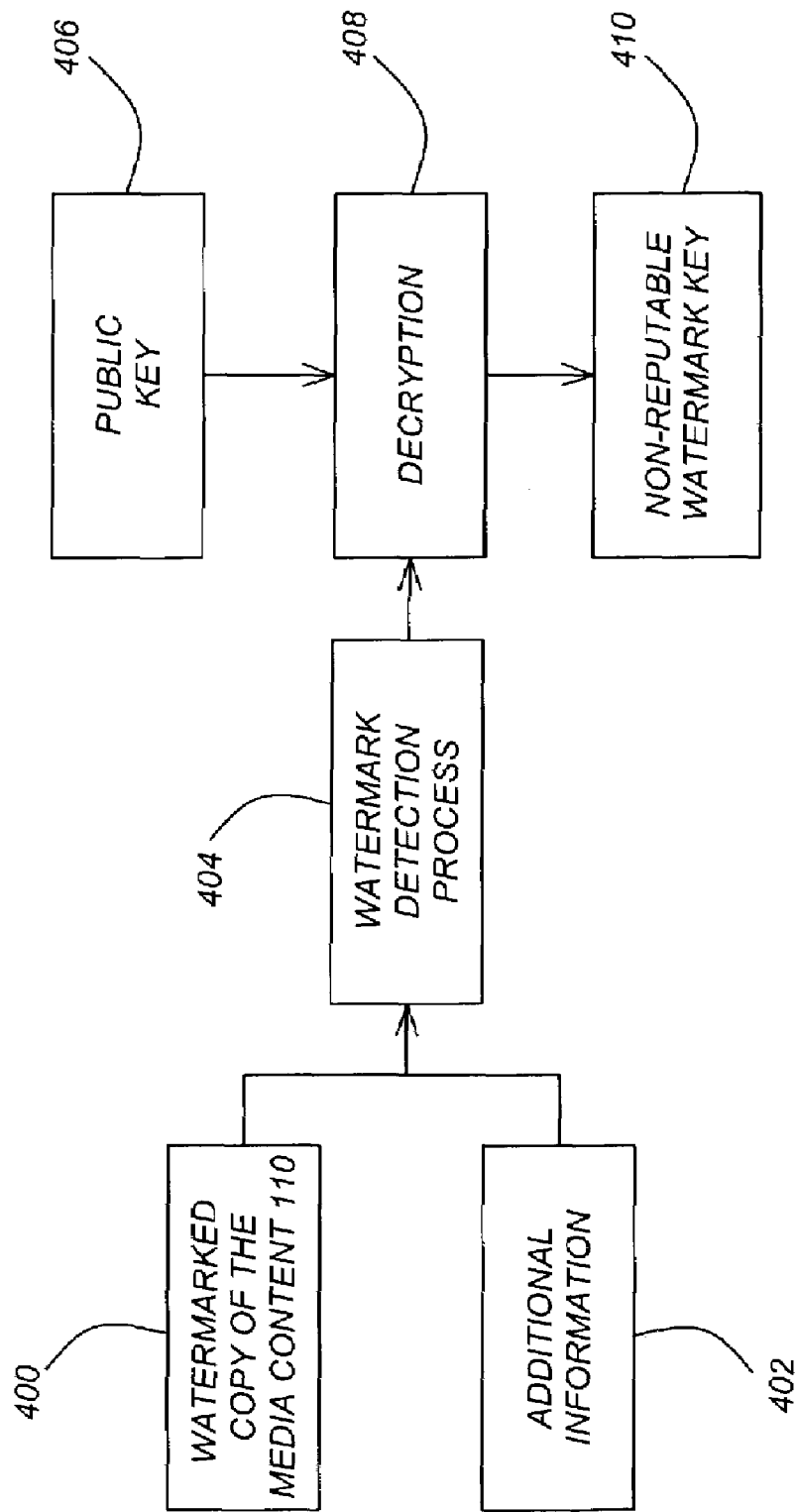
FIG. 4 is a flowchart that illustrates the steps of the watermark detection process performed by the content provider according to the preferred embodiment of the present invention.

FIG. 4 is a flowchart that illustrates the steps of the watermark detection process performed by the content provider 102 according to the preferred embodiment of the present invention.

Block 400 represents the content provider 102 obtaining a copy of the digital data 128 containing the watermarked media content 110.

Block 402 represents the content provider 102 obtaining a copy of the additional information associated with the watermarked media content 110 from the archive facility 112.

Block 404 represents the content provider 102 performing a watermark detection process, wherein an attempt is made to extract the watermark key from the digital data 128 containing the watermarked media content 110 using the additional information.

After a candidate watermark key is extracted from the digital data 128 containing the watermarked media content 110, Block 406 represents the content provider 102 obtaining the public key from the archive facility 112.

Block 408 represents the content provider 102 decrypting the nonce from the watermark key using the public key.

Block 410 represents the content provider 102 determining whether the watermark key is a non-reputable watermark key, by comparing the nonce decrypted from the watermark key to the nonce given the distribution entity 106 at the initial exchange (i.e., the value 2 in the above example). If the nonces match, then the content provider 102 has successfully identified the source of the digital data 128 containing the watermarked media content 110; otherwise, the content provider 102 has determined that the digital data 128 containing the watermarked media content 110 is counterfeit (i.e., it has an unrecognizable watermark).

Note also that some or all of these Blocks may be performed in an iterative manner by the content provider 102, in order to compare the digital data 128 containing the watermarked media content 110 against a plurality of non-reputable watermark keys, i.e., against a plurality of nonces generated by the content provider 102. In each iteration, the content provider 102 may obtain a copy of the additional information associated with a specific version of the watermarked media content 110, attempt to extract a watermark key from the watermarked media content 110 using the additional information, obtain a public key associated with the specific version of the watermarked media content 110, decrypt the nonce from the watermark key using the public key associated with the specific version of the watermarked media content 110, and then match the nonce decrypted from the watermark key to the nonce associated with the specific version of the watermarked media content 110. If a match is made, then the source of the watermarked media content 110 is successfully identified; if no match is made, then the watermarked media content 110 is counterfeit.

CONCLUSION

This concludes the description of the preferred embodiment of the invention. The following describes some alternative embodiments for accomplishing the present invention. For example, many types of watermarking and nonces could be used with the present invention. In addition, different sequences of exchanging data could be used than that described herein.

In summary, the present invention discloses a system for creating non-repudiation (undeniable) watermarks, wherein a content provider uses outside distribution entities to distribute media content supplied by the content provider. Content watermarked by a distribution entity using this system is undeniably recognizable by the content provider as originating with that particular distribution entity. In other words, given N distribution entities, the content provider is able to tell which particular distribution entity watermarked the media content. The system does not allow any distribution entity to watermark media content so that would appear to have been watermarked by another distribution entity and the system does also not allow the content provider to watermark media content so that would appear to have been watermarked by a particular distribution entity. Consequently, this allows the content provider to place a high degree of trust in the identification of the distribution entity by means of the watermark.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method for creating non-repudiation watermarking protection based on public and private keys, comprising:
   (a) distributing media content front a content provider to a particular distribution entity selected from a plurality of distribution entities, for subsequent distribution to one or more displaying entities separate from the content provider and distribution entities;
   (b) providing a nonce from the content provider to the particular distribution entity;
   (c) generating a public and private key pair for the watermark at the particular distribution entity, wherein the private key of the pair is used by the particular distribution entity to encrypt the nonce as a watermark key;
   (d) generating a watermarked copy of the media content at the particular distribution entity using the watermark key;
   (e) transmitting the public key of the pair from the particular distribution entity only to the content provider, wherein the public key is not shared with any other entity; and
   (f) detecting the watermark in the watermarked media content at the content provider by obtaining the watermarked copy of the media content, extracting the watermark key therefrom, and decrypting the nonce from the extracted watermark key using the public key of the pair;
   (g) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

2. The method of claim 1, wherein the nonce is a pseudo-random value.

3. The method of claim 1, wherein the nonce is provided to each distribution entity by the content provider at a specified granularity.

4. The method of claim 3, wherein the specified granularity is selected from a group comprising once per media content, once per content provider, once per distribution entity, once per displaying entity, or once per presentation.

5. The method of claim 1, wherein the transmitting step (e) comprises transmitting the public key of the pair from the distribution entity to the content provider, wherein the public key of the pair is signed by a private key of the distribution entity.

6. The method of claim 1, further comprising transmitting additional information to the content provider, wherein the additional information allows the content provider to obtain the watermark key from the watermarked media content.

7. The method of claim 1, further comprising transmitting the watermarked copy of the media content to a displaying entity.

8. An apparatus for creating non-repudiation watermarking protection based on public and private keys, comprising:
   (a) means, performed by a processor, for distributing media content from a content provider to a particular distribution entity selected from a plurality of distribution entities, for subsequent distribution to one or more displaying entities separate from the content provider and distribution entities;
   (b) means, performed by a processor, for providing a nonce from the content provider to the particular distribution entity;
   (c) means, performed by a processor, for generating a public and private key pair for the watermark at the particular distribution entity, wherein the private key of the pair is used by the particular distribution entity to encrypt the nonce as a watermark key
   (d) means, performed by a processor, for generating a watermarked copy of the media content at the particular distribution entity using the watermark key;
   (e) means, performed by a processor, for transmitting the public key of the pair from the particular distribution entity only to the content provider, wherein the public key is not shared with any other entity; and
   (f) means, performed by a processor, for detecting the watermark in the watermarked media content at the content provider by obtaining the watermarked copy of the media content, extracting the watermark key therefrom, and decrypting the nonce from the extracted watermark key using the public key of the pair;
   (g) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

9. The apparatus of claim 8, wherein the nonce is a pseudo-random value.

10. The apparatus of claim 8, wherein the nonce is provided to each distribution entity by the content provider at a specified granularity.

11. The apparatus of claim 10, wherein the specified granularity is selected from a group comprising once per media content, once per content provider, once per distribution entity, once per displaying entity, or once per presentation.

12. The apparatus of claim 8, wherein the means for transmitting (e) comprises means for transmitting the public key of the pair from the distribution entity to the content provider, wherein the public key of the pair is signed by a private key of the distribution entity.

13. The apparatus of claim 8, further comprising means for transmitting additional information to the content provider, wherein the additional information allows the content provider to obtain the watermark key from the watermarked media content.

14. The apparatus of claim 8, further comprising means for transmitting the watermarked copy of the media content to a displaying entity.

15. A method for creating non-repudiation watermarking protection based on public and private keys, comprising:
   (a) distributing media content to a particular distribution entity selected from a plurality of distribution entities, for subsequent distribution to one or more displaying entities separate from the content provider and distribution entities;
   (b) providing a nonce to the particular distribution entity, wherein the particular distribution entity generates a public and private key pair for the watermark, uses the private key of the pair to encrypt the nonce, and generates a watermarked copy of the media content using the watermark key;
   (c) receiving the public key of the pair from the particular distribution entity only at the content provider, wherein the public key is not shared with any other entity; and
   (d) detecting the watermark in the watermarked copy of the media content by obtaining a copy of the watermarked media content, extracting the watermark key therefrom, and decrypting the nonce from the extracted watermark key using the public key of the pair;
   (e) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

16. The method of claim 15, wherein the nonce is a pseudo-random value.

17. The method of claim 15, wherein the nonce is provided to each distribution entity at a specified granularity.

18. The method of claim 17, wherein the specified granularity is selected from a group comprising once per media content, once per content provider, once per distribution entity, once per displaying entity, or once per presentation.

19. The method of claim 15, wherein the receiving step (c) comprises receiving the public key of the pair from the distribution entity, wherein the public key of the pair is signed by a private key of the distribution entity.

20. The method of claim 15, further comprising receiving additional information from the distribution entity, wherein the additional information allows the watermark key to be located in the watermarked copy of the media content.

21. An apparatus for creating non-repudiation watermarking protection based on public and private keys, comprising:
   (a) means, performed by a processor, for distributing media content to a particular distribution entity selected from a plurality of distribution entities, for subsequent distribution to one or more displaying entities separate from the content provider and distribution entities;
   (b) means, performed by a processor, for providing a nonce to the particular distribution entity, wherein the particular distribution entity generates a public and private key pair for the watermark, uses the private key of the pair to encrypt the nonce, and generates a watermarked copy of the media content using the watermark key;
   (c) means, performed by a processor, for receiving the public key of the pair from the particular distribution entity only at the content provider, wherein the public key is not shared with any other entity; and
   (d) means, performed by a processor, for detecting the watermark in the watermarked copy of the media content by obtaining a copy of the watermarked media content, extracting the watermark key therefrom, and decrypting the nonce from the extracted watermark key using the public key of the pair;
   (e) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

22. The apparatus of claim 21, wherein the nonce is a pseudo-random value.

23. The apparatus of claim 21, wherein the nonce is provided to each distribution entity at a specified granularity.

24. The apparatus of claim 23, wherein the specified granularity is selected from a group comprising once per media content, once per content provider, once per distribution entity, once per displaying entity, or once per presentation.

25. The apparatus of claim 21, wherein the means for receiving (c) comprises means for receiving the public key of the pair from the distribution entity, wherein the public key of the pair is signed by a private key of the distribution entity.

26. The apparatus of claim 21, further comprising means for receiving additional information from the distribution entity, wherein the additional information allows the watermark key to be located in the watermarked copy of the media content.

27. A method for creating non-repudiation watermarking protection based on public and private keys, comprising:
   (a) receiving media content from a content provider at a particular distribution entity selected from a plurality of distribution entities, for subsequent distribution to one or more displaying entities separate from the content provider and distribution entities;
   (b) receiving a nonce from the content provider at the particular distribution entity;
   (c) generating a public and private key pair at the particular distribution entity;
   (d) encrypting the nonce as a watermark key using the private key of the pair at the particular distribution entity;
   (e) generating a watermarked copy of the media content using the watermark key at the particular distribution entity; and
   (f) transmitting the public key of the pair only to the content provider from the particular distribution entity, wherein the public key is not shared with any other entity;
   (g) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

28. The method of claim 27, wherein the nonce is a pseudo-random value.

29. The method of claim 27, wherein the nonce is provided by the content provider at a specified granularity.

30. The method of claim 29, wherein the specified granularity is selected from a group comprising once per media content, once per content provider, once per distribution entity, once per displaying entity, or once per presentation.

31. The method of claim 27, wherein the transmitting step (f) comprises transmitting the public key of the pair to the content provider, wherein the public key of the pair is signed by a private key of the distribution entity.

32. The method of claim 27, further comprising transmitting additional information to the content provider, wherein the additional information allows the content provider to locate the watermark key in the watermarked copy of the media content.

33. The method of claim 27, further comprising transmitting the watermarked copy of the media content to a displaying entity.

34. An apparatus for creating non-repudiation watermarking protection based on public and private keys, comprising:
  (a) means, performed by a processor, for receiving media content from a content provider at a particular distribution entity selected from a plurality of distribution entities, for subsequent distribution to one or more displaying entities separate from the content provider and distribution entities;
  (b) means, performed by a processor, for receiving a nonce from the content provider at the particular distribution entity;
  (c) means, performed by a processor, for generating a public and private key pair at the particular distribution entity;
  (d) means, performed by a processor, for encrypting the nonce as a watermark key using the private key of the pair at the particular distribution entity;
  (e) means, performed by a processor, for generating a watermarked copy of the media content using the watermark key at the particular distribution entity; and
  (f) means, performed by a processor, for transmitting the public key of the pair only to the content provider from the particular distribution entity, wherein the public key is not shared with any other entity;
  (g) wherein the media content watermarked by the particular distribution entity is undeniably recognizable by the content provider as originating with that particular distribution entity from among all of the plurality of distribution entities, thereby allowing the content provider to place a high degree of trust in an identification of the particular distribution entity by means of the watermark.

35. The apparatus of claim 34, wherein the nonce is a pseudo-random value.

36. The apparatus of claim 34, wherein the nonce is provided by the content provider at a specified granularity.

37. The apparatus of claim 36, wherein the specified granularity is selected from a group comprising once per media content, once per content provider, once per distribution entity, once per displaying entity, or once per presentation.

38. The apparatus of 34, wherein the means for transmitting (f) comprises means for transmitting the public key of the pair to the content provider, wherein the public key of the pair is signed by a private key of the distribution entity.

39. The apparats of claim 34, further comprising means for transmitting additional information to the content provider, wherein the additional information allows the content provider to locate the watermark key in the watermarked copy of the media content.

40. The apparatus of claim 34, further comprising means for transmitting the watermarked copy of the media content to a displaying entity.

* * * * *

UNITED STATES PATENT AND TRADEMARK OFFICE
CERTIFICATE OF CORRECTION

PATENT NO. : 7,603,720 B2
APPLICATION NO. : 10/419489
DATED : October 13, 2009
INVENTOR(S) : Rockwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Fifth Day of October, 2010

David J. Kappos
*Director of the United States Patent and Trademark Office*